(12) United States Patent
Decker

(10) Patent No.: US 6,286,253 B1
(45) Date of Patent: Sep. 11, 2001

(54) METHOD FOR PLANTING AND STABILIZING SODS GROWN OVER PLASTIC USING VEGETATIVE PLANTING MATERIAL

(75) Inventor: Henry F. Decker, Ostrander, OH (US)

(73) Assignee: Buckeye Bluegrass Farms, Inc, Ostrander, OH (US)

( * ) Notice: Subject to any disclaimer, the term of this patent is extended or adjusted under 35 U.S.C. 154(b) by 0 days.

(21) Appl. No.: 09/335,764

(22) Filed: Jun. 18, 1999

(51) Int. Cl.$^7$ ........................................................ A01C 1/04
(52) U.S. Cl. ................................................................ 47/56
(58) Field of Search .............................................. 47/56, 58

(56) References Cited

U.S. PATENT DOCUMENTS

| | | | |
|---|---|---|---|
| 3,863,388 | * | 2/1975 | Loads ........................................ 47/56 |
| 4,099,345 | * | 7/1978 | Loads ........................................ 47/56 |
| 4,716,679 | * | 1/1988 | Heard ........................................ 47/56 |
| 4,982,526 | * | 1/1991 | Miyachi ..................................... 47/56 |

* cited by examiner

*Primary Examiner*—Thomas Price
(74) *Attorney, Agent, or Firm*—Isaac Angres; Susan Petraglia

(57) ABSTRACT

A method for planting and stabilizing soilless sods is taught, beginning with planting pure stock of the desired cultivar in sterile media over plastic sheeting. The pure stock, once it has matured into a sod, it is harvested and milled into vegetative planting material. The milled material is suspended in a liquid slurry in an agitating tank and discharged into a trailing planter assembly that spreads the slurry evenly over unrolling plastic sheeting where it acts not only as planting material but, in sufficient quantities, also as a stabilizing protective mulch that maintains the integrity of the young sod crop in severe storms. Unlike sprigs or stolons the milled planting stock is produced from whole plant tissue and is comprised of many plantlets with intact root, stem, and leaf tissue. A bushel of milled turf plantlets is much more dense than a bushel of sprigs or stolons and comprises meristems from all parts of the plant including roots, crowns, and rhizomes.

20 Claims, 1 Drawing Sheet

METHOD FOR PLANTING AND STABILIZING SODS GROWN OVER PLASTIC USING VEGETATIVE PLANTING MATERIAL

TECHNICAL FIELD

This invention relates generally to sod production and, more particularly, to the rapid growth of sod over an impervious surface such as plastic sheeting.

BACKGROUND OF THE INVENTION

The concept of growing sods over plastic sheeting goes back, at least in the United States, to experiments conducted by Henry F. Decker at Ohio Wesleyan University starting in the later 1960's. The concept was first published in an April 1975 newspaper article in the Columbus (Ohio) Dispatch from which it was widely distributed around the U.S. and into several other countries by the Associated Press. A more extensive article also appeared in the June 1975 trade magazine "Weeds, Trees, and Turf" (now Landscape Management). Later phases of the research were supported by grants from the National Science Foundation.

In these early experiments it was shown that it was feasible to grow grass sods over a root impervious surface, typically plastic sheeting, using various contrived growing media in place of topsoil. There were several distinct advantages to growing sods in this manner. The primary rooting of the grasses could be used to knit the sod and could be maintained intact in the final product, unlike in conventional sodding where the primary rooting is cut off when the sod is harvested and then has to be regenerated when the sod is placed on its new site. Topsoil as the growing medium could also be replaced by a wide range of materials typically known to be waste materials. In addition, the sod is typically lighter as compared to mineral soil-grown sods. Moreover, since the primary rooting will be used to bind the sod, sod can be grown and harvested much more quickly, often in just a few weeks. These methodologies of "manufacturing sods" lend themselves to the harvesting and handling of sod in big rolls, often four feet wide by seventy feet or more long (Decker U.S. Pats. Nos. 4,986,026 and 5,177,898).

A wide variety of materials were tested as growing media in the early Ohio Wesleyan experiments and were listed in a 1972 Document Disclosure (012097) followed a year later by a patent application Ser. No. 371,462. These materials included organic wastes such as digested or composted garbage, leaves, and sewage sludge; seed or fruit hulls; spent tea leaves; loose and compressed cellulose fibers; wood chips and bark; sawdust, peats, and manures of various kinds; ground corn cobs; various grades, densities, and thicknesses of plastic foams; and many kinds of mineral matter including sand in varying grades, calcined clay, diatomaceous earth, and the expanded micas, such as perlite or vermiculite.

Later experiments included spent mushroom soil, straw, and composted sewage sludge, yard waste, and animal manures (Decker U.S. Pat. Nos. 4,986,026 and 5,177,898). Subsequent patents have also used rice hulls (Rogers et al U.S. Pat. No. 4,720,935), mushroom soil (Walton U.S. Pat. No. 4,934,094), conifer bark (Chamoulaud U.S. Pat. No. 4,232,481), straw (Heard U.S. Pat. No. 4,716,679), sand (Egan U.S. Pat. No. 5,301,446), and others. Other methods of production over plastic include using various types of nettings, geotextiles, polypropylene covers, burlaps, and other fabrics all of which are useful in specialized cases. In particular, composted sewage sludge and composted yard waste or the two of them in combination have proven to be very effective media and they are both plentiful, inexpensive, easy to handle, and rich in nutrients.

Despite the many apparent advantages of growing sods over plastic, there were several major problems that had to be solved before the innovative concept had any economic significance. These problems have been reviewed by Decker in U.S. Pat. Nos. 4,986,026 and 5,177,898. Probably the most difficult of these problems, especially to the east of the Rocky Mountain rain shadow, is that of severe thunderstorms which can quickly wipe clean a thin patina of growing medium placed unprotected on a smooth sheet of plastic. This common act of nature has made most patents in this genre, including the early ones by Goodall (G.B. 1,290, 338), Dawson (G.B. 1,455,133), Loads (U.S. Pat. No. 3,863, 388), Blackburn (U.S. Pat. No. 3,890,739), Schneider (U.S. Pat. No. 4,225,359), and others, impractical and uneconomical for large scale planting typical of U.S. sod production.

Solving the problem of thunderstorms figured prominently in the early history of soilless sod technology. The Decker patents teach the use of various mulches to form mulch/media/matrixes, some types of which are surprisingly resistant to laminar flow and hence to sheet erosion. In effect the mulch forms a continuum over the plastic into which the growing medium is infiltrated. If this "3M system" is carefully constructed, media as this as ¼ to ⅜th inch can be stabilized in severe thunderstorms which is a significant improvement in the stability of soilless sods.

All of the early work on soilless sods of which I am aware was done with seeded, largely cool season varieties of turfgrasses. I first began experimenting extensibly with warm season, vegetative material in Ohio in the summer of 1991 (Document Disclosures 294725 and 337067). Essentially, the seed in the mulch/medium/matrix was replaced with stolons or sprigs, and it was possible to produce high quality warm season sods in just a matter of a few weeks.

Different types of mulches were also tested including wood shavings, cocoa shells, shredded cypress bark, and pine needles; and some different growing media including composted yard mulch from Hilton Head, S.C., and crushed cocoa shells.

In the fall of 1993, RapidTurf, Inc. of Rincon Ga., hired me as a consultant to see if any of the principles learned from the "3M system" above could be applied to the production and stabilization of greens quality sods grown over plastic in a sand medium. RapidTurf was experiencing a common problem, namely, the integrity of their growing medium, which was a thin patina of USGA spec sand over plastic into which they planted sprigs or stolons, was being destroyed by the heavy thunderstorms characteristic of southeastern U.S. summers. No provision had been made for this environmental condition in their technique, nor was an adequate solution included in their recent U.S. patent (U.S. Pat. No. 5,301, 446). They were losing too much of their crop to severe thunderstorms.

The present invention solves the above problem (presented in Document Disclosures 342627, 363575, and 365091)and provides an efficient and reliable method for planting and, at the same time, stabilizing grass sods growing over plastic sheeting.

SUMMARY OF THE INVENTION

The method according to the invention is for planting and for stabilizing soilless sods, particularly bentgrass and bermudagrass sods, grown over plastic sheeting for golf greens and athletic fields. The novel method is summarized as follows: Registered stock of the desired cultivar is planted and grown in selected sterile media over plastic sheeting and typically, in a special, permanent nursery. When the nursery planting has matured into a sod, as needed, it is harvested in sod strips. The strips or whole pieces of sod are then placed in a hammermill and separated by screens into 2–3 inch pieces, many of which are plantlets with complete root systems. The vegetative planting material so produced is referred to as "milled turf pieces" or "milled turf plantlets" and, bushel for bushel, is much more dense than planting material derived from verticutting soil grown sod. A bushel of sprigs and stolons is defined as the gatherings raked from 1 square yard of soil grown sod and consists largely of stem, leaf, and stolons. In comparison, a bushel of milled turf plantlets according to the invention includes not only stem, leaf, and stolon, but also the entire plant including roots, crowns, and rhizomes. Just 200 bushels of milled turf product will give the same density of planting as 800 bushels of sprigs and stolons and will additionally include root, crown, and rhizome meristems.

Next the milled turf plantlets are planted by suspending sufficient quantities of them in a liquid slurry in an agitating tank, and discharging the slurry into a trailing planter assembly which distributes and drops the slurry evenly on unrolling plastic sheeting that is typically 8 feet wide. A primary roller and grading implement are affixed to the trailing planter assembly and smooth out any tire tracks made by the trailer conveying the agitating tank. A pinch roller places the plastic smoothly on the ground. Selected growing media are then applied by turf topdressers or spinner type spreaders over the slurry to infiltrate the vegetative growing material.

The slurry of milled turf pieces or plantlets can be extended if necessary with other mulches, can be applied to the plastic in sufficient enough quantities to form a continuum over the plastic sheeting. The milled turf then acts not only as planting material, but as its own protective mulch making the young sod highly resistant to erosion by severe storms.

DETAILED DESCRIPTION OF THE INVENTION

In providing consulting services to RapidTurf, Inc. in Rincon, Ga., it was apparent to me that production improvements to the technology covered by U.S. Pat. No. 5,301,446 (to RapidTurf) were necessary in order to stabilize the USGA sand used as a medium over plastic and into which sprigs or stolons were planted. The problem not addressed in the '446 patent was that the sand was washing away in severe storms and the sprigs or stolons blowing away in strong, drying winds.

The first improvement herein was to put the vegetative planting material on the plastic first, and then cover it with sand. This served to greatly reduce the chances of the vegetative planting material either from drying between waterings or blowing away.

The second improvement to the '446 patent and achieved by the present invention consisted of developing a machine that could distribute the vegetative planting material as evenly as possible over the plastic before the sand is applied. Various experiments indicated that there were several ways to do this. For example, by dropping the material onto a spinner that distributed it over the plastic; by dropping the material off a machine with a moving floor; by blowing it over the area to be planted; or by placing the vegetative material in a liquid slurry and distributing this on the plastic before the sand is applied.

Figure 1:
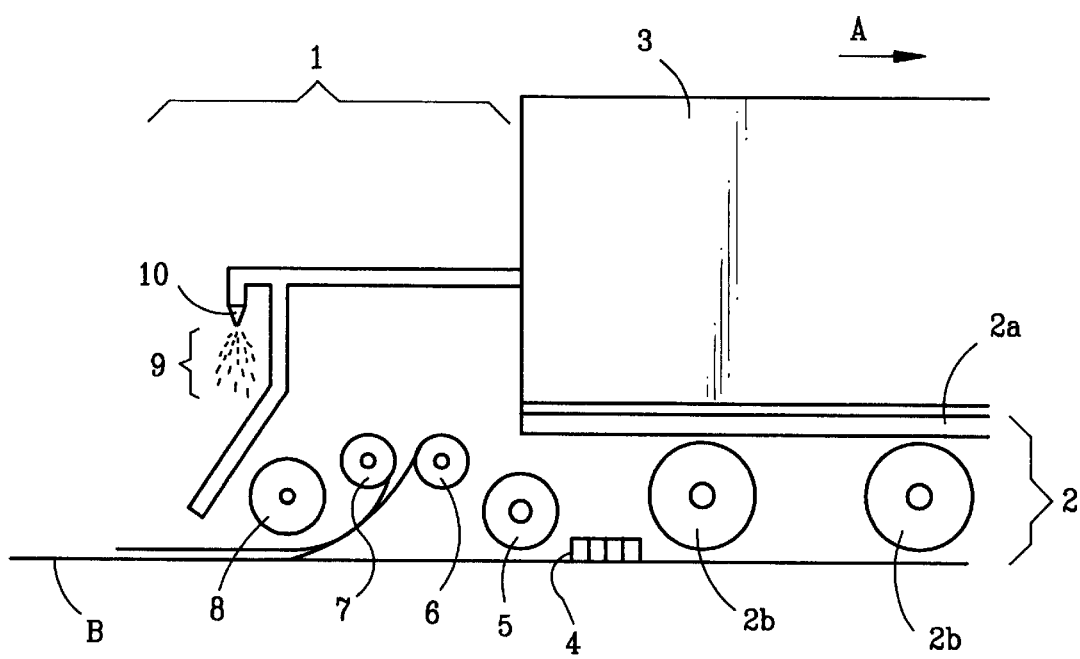
FIG. 1 is a lateral view of a trailing planter assembly according to one embodiment of the invention, showing the positioning of the parts thereof and the assembly's spatial relationship relative to the truck or trailer that conveys the agitating tank.

The liquid slurry method proved to be the most effective. With reference to FIG. 1, a trailing planter assembly 1 was built (Document Disclosure 342627 filed Nov. 4, 1993) that trails behind a trailer or truck 2 moving in a direction A. The bed 2a of the trailer or truck 2 conveys an agitating tank 3 in which the vegetative material is held in a liquid slurry suspension. The trailing planter assembly 1 consists of a rake or grading device 4 and a primary roller 5 to smooth, if necessary, any tracks formed by the tires 2b of the trailer or truck conveying the heavy agitating tank. The assembly also holds one or two rolls of plastic sheeting 6 and 7, which rolls are typically eight or more feet wide, and a pinch roller 8 to aid their smooth unrolling over the surface of the ground B. The trailing planter assembly receives the liquid slurry of vegetative planting material 9 from the agitating tank 3 and the slurry of vegetative planting material 9 is discharged from the agitating tank and is distributed evenly and smoothly over the unrolling plastic sheeting. Selected media, such as sand or compost, can then be spread evenly over the slurry on the plastic with a typical turf topdresser or side spun by a spinner box-type spreader such as a Stoltzfus 561, 5 ton spreader.

Figure 2:
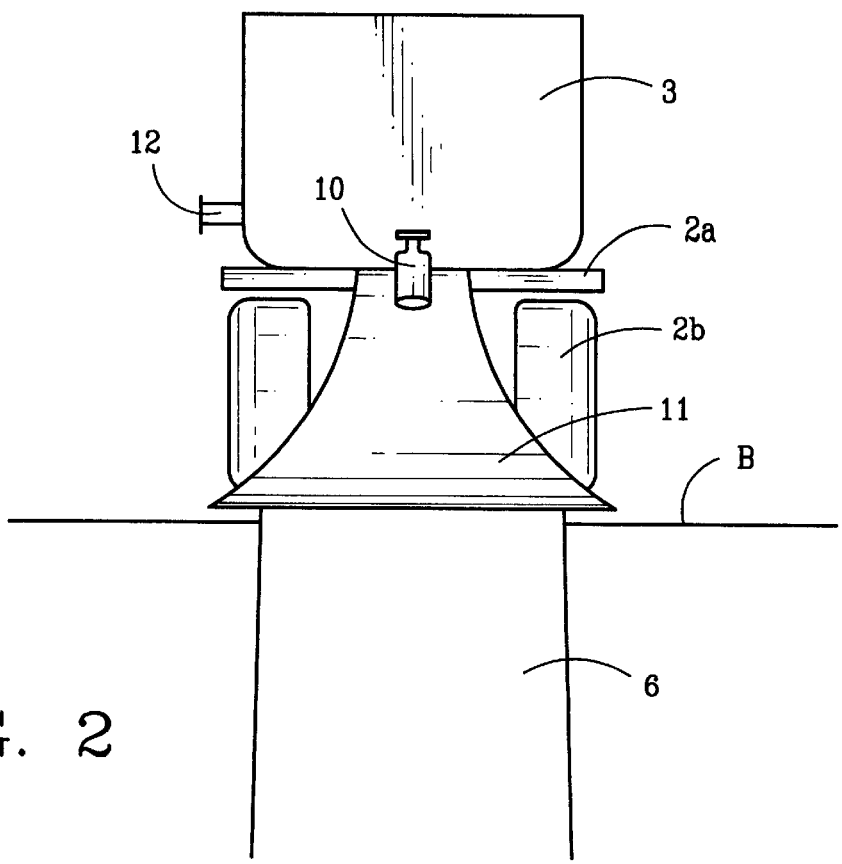
FIG. 2 is a rear view of a portion of the trailing planter assembly and the agitating tank.

FIG. 2 is based on the diagram filed in Disclosure Document 342627 and is a rear perspective view of the trailing planter assembly 1 and the agitating tank 3. More particularly, this view demonstrates the function of the spreading pan (or splash board) 11. All element numbers and letters are the same as in FIG. 1, unless specified otherwise. Trailer bed 2a, trailer tires 2b, plastic sheeting 6, and the ground surface B are shown to put the trailing planter assembly and agitating tank in perspective. Agitating tank 3 is approximately 100 to 600 gallons in size and features an aeration port 12. A planting material which includes chopped stolons, sprigs, a fibrous mulch and optionally, a pre-plant fertilizer, a sterilant (e.g., sodium hypochlorite), a fungicide, a rooting hormone, and other art-recognized growth stimulants are mixed in the tank 3 to form a slurry 9'. The slurry is aerated by bubbling air in through the aeration port 12. The agitated slurry is discharged through the discharge port 10 and splashes and spreads over the spreading pan (or splash board) 11, the width of which corresponds to the width of the plastic sheeting 6. Arrows C reflect the directions of the slurry 9' spreading evenly across and down the spreading pan (or splash board) 11, and onto the plastic sheeting 6.

A third improvement and significant aspect of the present invention is in growing sod over plastic using as vegetative planting material milled turf pieces or plantlets. The milled turf pieces are derived from pieces of sod that is of the cultivar to be planted and having been grown in a sterile medium over plastic, by separating the pieces into numerous smaller pieces of sod. Any means of separating the larger pieces of sod into appropriately sized pieces for the vegetative planting material is within the purview of the invention, naming for example, shredding, chopping, ginning, grinding, and milling. This produces vegetative planting material of the same cultivar to be planted and is comprised of not just sprigs or stolons, but meristems from all parts of the plant, including the complete root system, crowns, and rhizomes. Much of this vegetative planting material consists of complete plantlets with intact roots, stem, and leaf tissue.

Using milled turf harvested from sod grown over plastic is a novel method (Documents Disclosure 363575) for the vegetative propagation of grasses, In particular warm season grasses such as bermudagrass, zoysiagrass, buffalograss, and others. It is much more effective than using sprigs or stolons for the following reasons. A bushel of milled turf pieces is more dense and has several times as many growing points or meristems as a comparable bushel of sprigs or stolons. A bushel of sprigs or stolons is defined as the gatherings from the linear verticutting of a square yard of conventional soil-grown sod and is comprised largely of stolons, stem, and leaf tissue. A bushel of milled turf plantlets, on the other hand, represents the product from the milling of a whole square yard of sod grown over plastic so that the complete root system is included. Where harvested sprigs or stolons consist largely of the upper plant or stem, stolon, and leaf tissue, milled turf plantlets include not only the upper plant but all the roots, crowns, and rhizomes trapped by the plastic and constituting the entire square yard of sod.

Two hundred bushels of milled turf pieces spread over an acre will produce a very dense planting that is several times more dense than two hundred bushels of sprigs or stolons. It is into this mass of milled turf pieces that the growing medium is infiltrated. Hence 200 bushels of milled turf will have the same effect as mulch, i.e., it will protect the plastic and will give the young sod stability in severe storms. Essentially the planting material itself (whether ground-up, shredded, or milled sod) becomes the fibrous mulch part of the "3M" system. If this material is not sufficient to complete the continuum over the plastic, then it can be extended with a suitable, sterile, fine, mulch such as paper pulp waste or wood fibers.

Another significant advantage of milled turf pieces or plantlets is that they can be milled through a two or three inch screen making them uniform and fine enough to flow easily in a liquid slurry through a progressive cavity pump.

The registered stock to be grown for milled turf pieces or plantlets can be grown in any of a number of media such as sand, composted yard waste, conifer bark, and many others that are sterile or easy to sterilize. While the milling removes much of the media from the vegetative planting material, any remaining media can be removed if necessary by placing the material in a trammel screen or shaking conveyor or by washing it.

The slurry forming liquid is any liquid that will facilitate a dispersion or suspension of the milled pieces and also that will not be detrimental to the milled turf pieces, the plastic sheeting, the apparatus used to apply the slurry, the subsequent growth and stability of the sod, and the environment. A typical liquid for the slurry is water or an aqueous-based nutrient solution.

The "active", extended, mulch slurry is spread on plastic and then can be infiltrated with $\frac{1}{8}$ to $\frac{3}{4}$ inch of growing medium such as sand, composted sewage sludge or yard waste, or many other readily available growing media to produce a high quality, stabilized, grass sod. The slurry is described as "active" because it contains meristem tissue. This active, extended mulch/medium/matrix can also be further strengthened, if necessary, by applying another layer of fine mulch across the top of the growing medium/active extended mulch. Optionally, a gel polymer, and various plant tacks and glues may also be applied across the additional layer of fine mulch or added simultaneously therewith.

It is also feasible that if the volume of milled turf pieces placed over the plastic were increased to a point where the plastic was completely covered with the vegetative planting material then it would be possible to grow any type of sod, with warm or cool season grasses, with a much reduced amount of growing medium or possibly, no medium at all (Document Disclosure #365091).

The following example is included merely to illustrate various aspects of the invention and is not to be construed as limiting the scope of the appended claims.

EXAMPLE

Sod is planted for growth on plastic sheeting using milled turf pieces, prepared in accordance with the above disclosure, according to the following various embodiments:

Milled, ground, or shredded pieces of the sod cultivar to be grown over plastic, of either cool or warm season grasses, and of either seeded or vegetatively planted grasses, are spread at a high density over plastic sheeting using the trailing planter assembly as shown in FIG. 1.

A gel polymer such as Terrazorb HB or GB can be added, either to the slurry or applied separately thereafter, for increased water retention.

Milled sod from seeded cultivars is seeded at normal rates with a matching seed.

Starter fertilizers, lime, organic fertilizers or miscellaneous additives required to maintain an effective nutrient base; and standard fertilizer or fertigation regimes are begun.

A hydromulch, granular mulch, and/or organic tack can be applied for added protection.

Regarding sods that are grown for golf greens or other athletic fields, if an objectionable organic layering effect forms in the sod because of an excess of vegetative planting material, the layering effect can be prevented in the sod growth process by incorporating into the fertilizer regime organic fertilizers containing active composting bacteria or by applying cellulose digesting enzymes such as cellulase directly to the growing sod.

What is claimed:

1. A method for planting and stabilizing sods grown over plastic sheeting comprising:

planting and growing pure, whole sod stock of a desired cultivar over plastic sheeting in a sterile medium;

harvesting said whole sod;

separating harvested sod into vegetative planting material to form plantlets;

suspending said plantlets in a liquid slurry;

laying plastic sheeting of a predetermined width on a ground surface, said plastic sheeting being bounded on the lateral edges thereof by only an adjacent second plastic sheeting of the same width to be laid down; and discharging said slurry evenly over said plastic sheeting, wherein said plantlets in the liquid slurry are applied onto said plastic sheeting in an amount such that they are both a planting material and a stabilizing, protective mulch that maintains the integrity and the purity of the young sod crop, thereby obviating the need to dispense a cover sheet over said discharged slurry of plantlets.

2. A method according to claim 1 wherein the step of separating harvested sod into plantlets is comprised of grinding, shredding, chopping, ginning, and milling harvested sod of the same sod cultivar to be grown.

3. A method according to claim 2 wherein the plantlets consist essentially of whole plant tissues comprised of a mixture of leaf, stem, stolon, roots, crowns, and rhizomes.

4. A method according to claim 3 wherein the plantlets consist essentially of intact roots, leaves, and stems.

5. A method according to claim 1 wherein the plantlets per volume are more dense than conventional sprigs and stolons.

6. A method according to claim 1 wherein the plantlets per volume contain more growing points or meristems than conventional sprigs and stolons.

7. A method according to claim 5 wherein the plantlets per volume contain more growing points or meristems than conventional sprigs and stolons.

8. A method according to claim 1 wherein the plantlets include an extender comprising sterile mulches to form a continuous layer over said unrolling plastic sheeting.

9. A method according to claim 1 wherein the plantlets are of such a volume as to act as a mulch that is resistant to erosion in severe thunderstorms.

10. A method according to claim 1 further comprising, when said plantlets are derived from seeded or cool season grasses, sowing plantlets and seed from the same cultivar onto said unrolling plastic sheeting.

11. A method according to claim 1 wherein the liquid slurry of plantlets is discharged from an agitating slurry tank onto a trailing planter assembly that spreads the slurry evenly onto the unrolling plastic sheeting.

12. A method to claim 1 further comprising after discharging said slurry of plantlets evenly over said unrolling pastic sheeting, growing stabilized sod in the presence of at least one additive comprising a water retention aid, a starter fertilizer, lime, an organic fertilizer optionally containing active composting bacteria, a cellulose digesting enzyme, a hydromulch, a granular mulch, and plant tacks and glues.

13. A method according to claim 12 wherein the sod is grown in the presence of a water retention aid that is a gel polymer.

14. A method for planting and stabilizing sods grown over plastic sheeting comprising:

planting and growing pure, whole sod stock of a desired cultivar over plastic sheeting in a sterile medium;

harvesting said whole sod;

miling harvested sod into vegetative planting material to form plantlets;

suspending said plantlets in a liquid slurry;

laying plastic sheeting of a predetermined width on a ground surface, said plastic sheeting being bounded on the lateral edges thereof by only an adjacent second plastic sheeting of the same width to be laid down;

discharging said slurry evenly over said plastic sheeting, and infiltrating said evenly applied slurry of plantlets with a quantity of a growing medium, wherein said plantlets of the slurry are applied onto the plastic sheeting in an amount such that they are both a planting material and a stabilizing, protective mulch that maintains the integrity and the purity of the young sod crop, thereby obviating the need to dispense a cover sheet over said discharged slurry of plantlets.

15. A method according to claim 14 wherein the growing medium comprises sand, conifer bark, composted sewage sludge, and composted yard waste.

16. A method according to claim 15 wherein a volume of plantlets applied to said unrolling plastic sheeting is such to greatly reduce the quantity of added growing medium.

17. A method according to claim 16 wherein the plantlets are extended with a sterile mulch to form a continuous layer over said unrolling plastic sheeting.

18. A method according to claim 17 further comprising applying a strengthening layer of fine mulch across the top of a continuous layer of plantlets and extender that has been infiltrated with growing medium.

19. A method according to claim 14 further comprising growing stabilized sod in the presence of at least one additive comprising a water retention aid, a starter fertilizer, lime, an organic fertilizer optionally containing active composting bacteria, a cellulose digesting enzyme, a hydromulch, a granular mulch, and plant tacks and glues.

20. A method of producing a vegetative planting material substantially free from soil contamination and suitable for sod cultivation comprising:

planting and growing pure, whole, sod stock of a desired cultivar over plastic sheeting in a sterile medium;

harvesting said whole sod; and separating harvested sod into vegetative planting material, wherein the separating comprises grinding, shredding, chopping, ginning, or milling said harvested sod and wherein the vegetative planting material consists essentially of whole plant tissues comprised of a mixture of leaf, stem, stolon, roots, crowns, and rhizomes.

* * * * *